H. JACOB.
DISTANCE MEASURING INSTRUMENT.
APPLICATION FILED DEC. 9, 1910.
1,066,906.
Patented July 8, 1913.
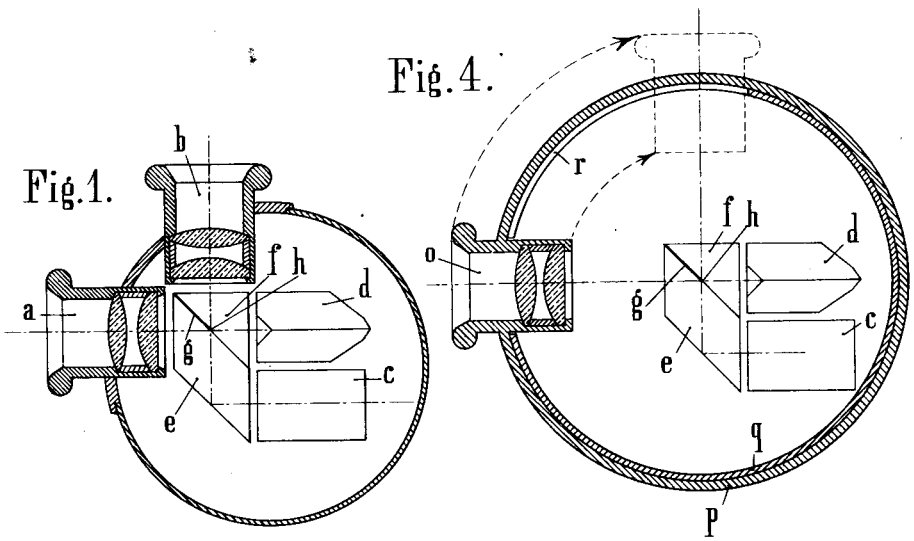
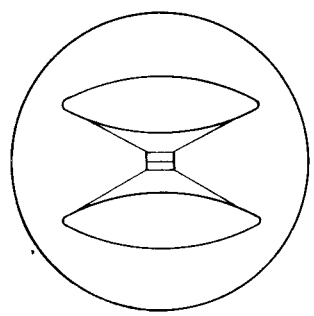
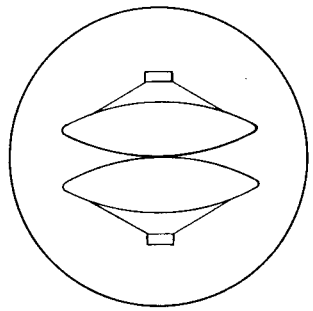
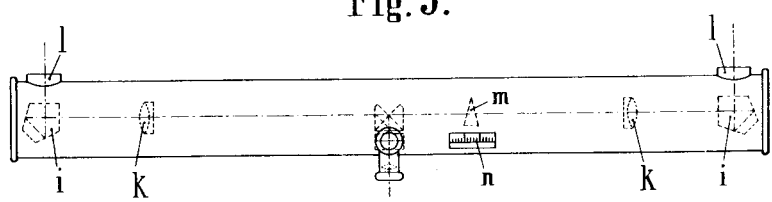

UNITED STATES PATENT OFFICE.

HEINRICH JACOB, OF STEGLITZ, NEAR BERLIN, GERMANY, ASSIGNOR TO THE FIRM OF OPTISCHE ANSTALT C. P. GOERZ AKTIENGESELLSCHAFT, OF FRIEDENAU, NEAR BERLIN, GERMANY.

DISTANCE-MEASURING INSTRUMENT.

1,066,906.

Specification of Letters Patent.   Patented July 8, 1913.

Application filed December 9, 1910. Serial No. 596,527.

*To all whom it may concern:*

Be it known that I, HEINRICH JACOB, a citizen of the German Empire, and resident of Steglitz, near Berlin, Germany, have invented certain new and useful Improvements in Distance-Measuring Instruments, of which the following is a specification.

This invention relates to so-called baseline distance-measuring instruments of the class wherein the dividing line of the image field is substantially parallel with the plane of the measuring triangle, and the object of the invention is so to construct the instrument that it is adapted both for measuring the distance of objects based on the ground, and rising more or less to a point or crest, and for measuring the distance of objects such as air-ships, which are suspended in the atmosphere and the mass of which is generally so distributed that the most strikingly apparent portions thereof are downwardly directed.

Experience has shown, that for accurate training on objects with upwardly directed points, the distance measuring instruments best adapted are those having prism systems arranged so that images appearing below the dividing line are upright, whereas images above the dividing line are inverted. This arrangement enables pointed promontories of the objects to be easily brought into coincidence with each other. In the case of objects having their most conspicuous parts directed downward it is, therefore, desirable to arrange the prism system so that the image below the dividing line is inverted, and the image above said line upright, so that the said conspicuous parts, recurring in both images, can be brought into coincidence with each other.

According to the present invention both the conditions set forth are met by providing the distance measuring instrument with an ocular device which enables the reflective surface producing the dividing line to be viewed from opposite sides, in directions which make an angle with each other, so that according to whether the said reflective surface is viewed from one side or the other, it has a reversing effect on the lower or on the upper image. The ocular device may either comprise two oculars placed at an angle to each other, as shown in Figure 1 of the drawing, or a single, rotatable ocular may be provided as shown in Fig. 4 of the drawing. In the case of an instrument with a straight line of view, with the upright image below the dividing line and the inverted image above same, the fact that reversal of the relative positions of the images is obtainable by altering the angle of view at the ocular affords the possibility of facilitating the observation of air-ships and the like toward which the instrument is directed.

The invention is illustrated in the annexed drawings, in which—

Fig. 1 is an axial section of the ocular system of a distance-measuring instrument having two oculars placed at an angle. Figs. 2 and 3, represent double images of an airship, differing according to whether the view is taken through one or the other ocular. Fig. 4 shows a modified construction of the ocular system in axial section. Fig. 5 is a diagrammatic view of the complete distance-measuring instrument.

In Fig. 1 of the drawing, the oculars are marked *a* and *b* respectively, it being assumed that the ocular *a* gives a rectilinear view, the ocular axis being, therefore, substantially parallel to the plane of the measuring triangle. The ocular system comprises in a known manner a combination of two crossed prisms *c* and *d*, the prism *d* being roof shaped. These two crossed prisms *c* and *d* serve to transmit the rays from the ends of the base line to a composite ocular prism consisting of a rhombohedral prism *e* and a right angled equilateral prism *f*. At part of the junction between the two prisms *e* and *f* there is a coating *g*, which is reflective on both sides, and the termination of which forms the dividing line *h*.

In the general view represented in Fig. 5, *i i* are pentahedral prisms at the ends of the base, which deflect the entering rays into the direction of the longitudinal axis of the instrument. *m* is an adjustable indicator, and *n* is the scale for taking readings.

When a distant object is viewed through the ocular *a* in a right line, the image appearing above the dividing line *h* is reflected by the coating *g* and then appears reversed, if originally upright. On viewing through the ocular *b*, the image above the dividing line appears as reflected by the prism surface in front of the reflective surface g. That is to say, it is upright, whereas the image below the dividing line is inverted, by deflection by the double sided reflector g, contrary to what is the case on viewing through the ocular a, when said lower image is outside the influence of the reflective surface g.

Fig. 2 shows an air-ship viewed through ocular b, and Fig. 3, the same object viewed through ocular a. Comparison of Figs. 2 and 3 will show that more accurate training of the instrument is in this case obtainable by viewing through ocular b.

The modified construction of the ocular system illustrated in Fig. 4 shows only one single ocular o carried by a rotatable casing p; said casing p is mounted on a second cylinder q provided with a slit r allowing angular displacement of the ocular o on cylinder q. The ocular prisms are of the same kind as those shown in Fig. 1, and therefore are designated again c, d, e, f; the reflective coating is again designated g and its edge h. The two kinds of observation correspond in this instance to the position of the ocular shown in full lines on the one hand and to the position shown in dotted lines on the other.

What I claim is:

1. In a distance-measuring instrument provided with means for producing images of distant objects above and below an image dividing line substantially parallel with the plane of the measuring triangle, an ocular device comprising a double sided reflecting layer inserted in the path of the rays passing through the instrument, and ocular means for viewing either side of said double sided reflecting layer at the will of the observer.

2. In a distance-measuring instrument provided with means for producing images of distant objects above and below an image dividing line substantially parallel with the plane of the measuring triangle, an ocular device provided with a two sided reflective surface and two oculars placed at an angle to each other, each of said oculars arranged in front of one side of said two sided reflective surface.

3. In a distance-measuring instrument provided with means for producing images of distant objects on opposite sides of an image dividing line substantially parallel with the plane of the measuring triangle, an ocular device comprising a prism system with a double sided reflecting layer inserted in the path of the rays passing through the instrument, said reflecting layer having an edge forming the dividing line in the image field, and being so arranged that the rays coming from distant objects and impinging on one side of the double sided reflecting layer are reflected in a direction substantially coincident with the plane of the measuring triangle, the rays impinging on the other side of said reflecting layer being reflected in a direction crossing the plane of the measuring triangle, the rays reflected from each of the sides of the double sided reflecting layers forming an image on one side of the image dividing line, the image formed by the first mentioned rays coöperating with an image on the other side of the dividing line so that an inverted image is formed above and an upright image below the image dividing line, whereas the image formed by the rays reflected by the other side of the reflecting layer coöperates with an image on the other side of the reflecting layer so that an upright image is seen above and an inverted image below the dividing line.

In testimony whereof I have signed this specification in the presence of two subscribing witnesses.

HEINRICH JACOB.

Witnesses:
 HENRY HASPER,
 WOLDEMAR HAUPT.